(12) United States Patent
Takala et al.

(10) Patent No.: US 9,256,728 B2
(45) Date of Patent: Feb. 9, 2016

(54) METHOD, APPARATUS, AND COMPUTER PROGRAM PRODUCT FOR MANAGING SOFTWARE VERSIONS

(75) Inventors: Janne Petteri Takala, Tampere (FI); Olli Pekka Juhani Muukka, Tampere (FI); Rauno Juhani Tamminen, Tampere (FI); Janne Johannes Jarvinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1946 days.

(21) Appl. No.: 12/323,737

(22) Filed: Nov. 26, 2008

(65) Prior Publication Data

US 2010/0132018 A1  May 27, 2010

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 21/51 | (2013.01) |
| H04L 9/32 | (2006.01) |

(52) U.S. Cl.
CPC ............. *G06F 21/51* (2013.01); *H04L 9/3263* (2013.01); *H04L 9/3265* (2013.01)

(58) Field of Classification Search
CPC . H04L 63/0823; H04L 9/3263; H04L 9/3265; H04L 9/3268
USPC ............................... 726/26, 30; 713/156–158
See application file for complete search history.

(56) References Cited

U.S. PATENT DOCUMENTS

| 4,688,169 | A | 8/1987 | Joshi |
| 5,995,026 | A | 11/1999 | Sellers |
| 6,978,365 | B2 * | 12/2005 | England .................. 713/156 |
| 7,734,549 | B2 * | 6/2010 | Dabbish et al. .............. 705/59 |
| 2004/0127196 | A1 | 7/2004 | Dabbish et al. |
| 2004/0230803 | A1 | 11/2004 | Kuhls |

(Continued)

FOREIGN PATENT DOCUMENTS

| CN | 101189613 A | 5/2008 |
| EP | 1465043 A2 | 10/2004 |
| WO | WO 03/019337 A2 | 3/2003 |

OTHER PUBLICATIONS

Christian Gehrmann and Per Stahl, Mobile platform security, 2006, Ericsson Review, No. 2, pp. 59-70.*

(Continued)

*Primary Examiner* — Ashok Patel
*Assistant Examiner* — Daniel Potratz
(74) *Attorney, Agent, or Firm* — Alston & Bird LLP

(57) ABSTRACT

An apparatus for managing software versions may include a processor. The processor may be configured to determine whether a security identifier of a first security certificate matches a trusted security identifier. In this regard, the first security certificate may include software version criteria. The processor may also be configured to determine whether a software version of a software application satisfies software version criteria of the first security certificate. The processor may be configured to make this determination in response to determining that the security identifier of the first certificate matches the trusted security identifier. Further, the processor may also be configured to permit execution of the software application, in response to determining that the software version satisfies the software version criteria. Associated methods and computer program products may also be provided.

17 Claims, 5 Drawing Sheets

(56) References Cited

U.S. PATENT DOCUMENTS

2005/0005098 A1 1/2005 Michaelis et al.
2006/0091209 A1 5/2006 He
2009/0006259 A1 1/2009 His

OTHER PUBLICATIONS

Gehrmann et al., "Mobile Platform Security," *Ericsson Review*, No. 2, 2006, pp. 59-70.
Office Action for Russion Federation Application No. 2011125615, dated Sep. 25, 2012.
Office Action for Chines Application No. 200980147474.6 dated Sep. 2, 2014.
Chinese Office Action for Application No. 200980147474.6, dated Jun. 9, 2013.
Office Action for Canadian Application No. 2,744,358; dated Jun. 25, 2013.
Office Action from Korean Patent Application No. 10-2011-7014585, dated Nov. 19, 2012.
Office Action for Chinese Application No. 200980147474.6 dated Mar. 7, 2014, 8 pages.
Office Action for Canadian Application No. 2,744,358 dated Mar. 25, 2014, 3 pages.
Supplementary European Search Report for Application No. EP 09 82 8707 dated Jan. 24, 2014.
International Search Report and Written Opinion for Application No. PCT/IB2009/097447 dated Mar. 2, 2010.
International Preliminary Report on Patentability for Application No. PCT/IB2009/007447 dated May 31, 2011.
Meng, X. et al., *Analysis of Detecting 802 1x Supplicant Software Version,* Journal of Kurming University of Science and Technology, vol. 32, No. 2 (Apr. 2007) 5 pages.
Zen, X., *Automatic Renewal of Applying Software Edition in System of MIS,* Computer and Modernization (Feb. 2005), 4 pages.
"*FAQ—Frequently Asked Questions;*" se-nse v6, SE-NSE Forums→Sony Ericsson Legacy Systems (JAVA, Symbian & Windows)→SE Firmware→Firmware & Flashing Discussion; retrieved on Aug. 15, 2013 from http://forums.se-nse.net/lofiversion/index.php/t4144.html (dated Jul. 16, 2006) 5 pages.

* cited by examiner

METHOD, APPARATUS, AND COMPUTER PROGRAM PRODUCT FOR MANAGING SOFTWARE VERSIONS

TECHNICAL FIELD

Embodiments of the present invention relate generally to software installation, and, more particularly, relate to a method, apparatus, and a computer program product for managing software versions.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Wired and/or wireless devices for executing applications, communicating data, and storing data have become important tools in both business and social environments. Individuals have come to rely on these devices to undertake everyday tasks, particularly tasks involving the sharing and communication of data. Users demand these communications capabilities, and as such, network providers that meet the consumer demands, do so while charging a fee for the provided services.

In some instances, in order to avoid payment of fees for communications, hackers may attempt to exploit security failures in software executed by communications devices. For example, vulnerabilities in software executed by a communications device, such as a cell phone or other mobile terminal, can be identified by hackers. Hackers may then exploit the vulnerability to communicate free of charge, use a cellular phone on unapproved cellular communications systems, or exploit other functionality of the cellular phone or the communications systems supporting the device.

BRIEF SUMMARY

A method, apparatus, and computer program product are described that provide for management of software in a manner that can prevent downgrading of software to out-of-date or older versions. Example embodiments of the present invention may use certificates (e.g., security certificates) to verify that proper software versions are installed on a device, such as a computing or communications device. In some example embodiments, a certificate may be associated with a device (e.g., a hardware certificate), and another certificate may be associated with a software application of a particular version (e.g., a common configuration certificate). The hardware certificate may be authenticated with a public identifier of the device. Upon authentication of the hardware certificate, the common configuration certificate may be authenticated and a version of the common configuration certificate may be verified against security certificate version criteria of the hardware certificate. If the common configuration certificate is authenticated and the version is verified, the version of the software installed on the device may be verified and permission may be granted to execute the software. Note also that while the description above is directed to an example embodiment that employs two security certificates, some example embodiments may employ one security certificate.

In one example embodiment, a method for managing software versions is provided. The example method may include determining whether a security identifier of a first security certificate matches a trusted security identifier. In this regard, the first security certificate may include software version criteria. The example method may also include determining whether a software version of a software application satisfies software version criteria of the first security certificate. This determination may be made in response to determining that the security identifier of the first certificate matches the trusted security identifier. Further, the method may also include permitting execution of the software application by a processor, in response to determining that the software version satisfies the software version criteria.

In another example embodiment, an apparatus for managing software versions is provided. The apparatus may include a processor. The processor may be configured to determine whether a security identifier of a first security certificate matches a trusted security identifier. In this regard, the first security certificate may include software version criteria. The processor may also be configured to determine whether a software version of a software application satisfies software version criteria of the first security certificate. The processor may be configured to make this determination in response to determining that the security identifier of the first certificate matches the trusted security identifier. Further, the processor may also be configured to permit execution of the software application, in response to determining that the software version satisfies the software version criteria.

In another example embodiment, a computer program product for managing software versions is provided. The computer program product may include one or more computer-readable storage mediums having executable computer-readable program code instructions stored therein. The computer-readable program code instructions may be configured to determine whether a security identifier of a first security certificate matches a trusted security identifier. In this regard, the first security certificate may include software version criteria. The computer-readable program code instructions may also be configured to determine whether a software version of a software application satisfies software version criteria of the first security certificate. The computer-readable program code instructions may be configured to make this determination in response to determining that the security identifier of the first certificate matches the trusted security identifier. Further, the computer-readable program code instructions may also be configured to permit execution of the software application, in response to determining that the software version satisfies the software version criteria.

In yet another example embodiment, an apparatus for managing software versions is provided. The example apparatus may include means for determining whether a security identifier of a first security certificate matches a trusted security identifier. In this regard, the first security certificate may include software version criteria. The example apparatus may also include means for determining whether a software version of a software application satisfies software version criteria of the first security certificate. This determination may be made in response to determining that the security identifier of the first certificate matches the trusted security identifier. Further, the apparatus may also include means for permitting execution of the software application, in response to determining that the software version satisfies the software version criteria.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
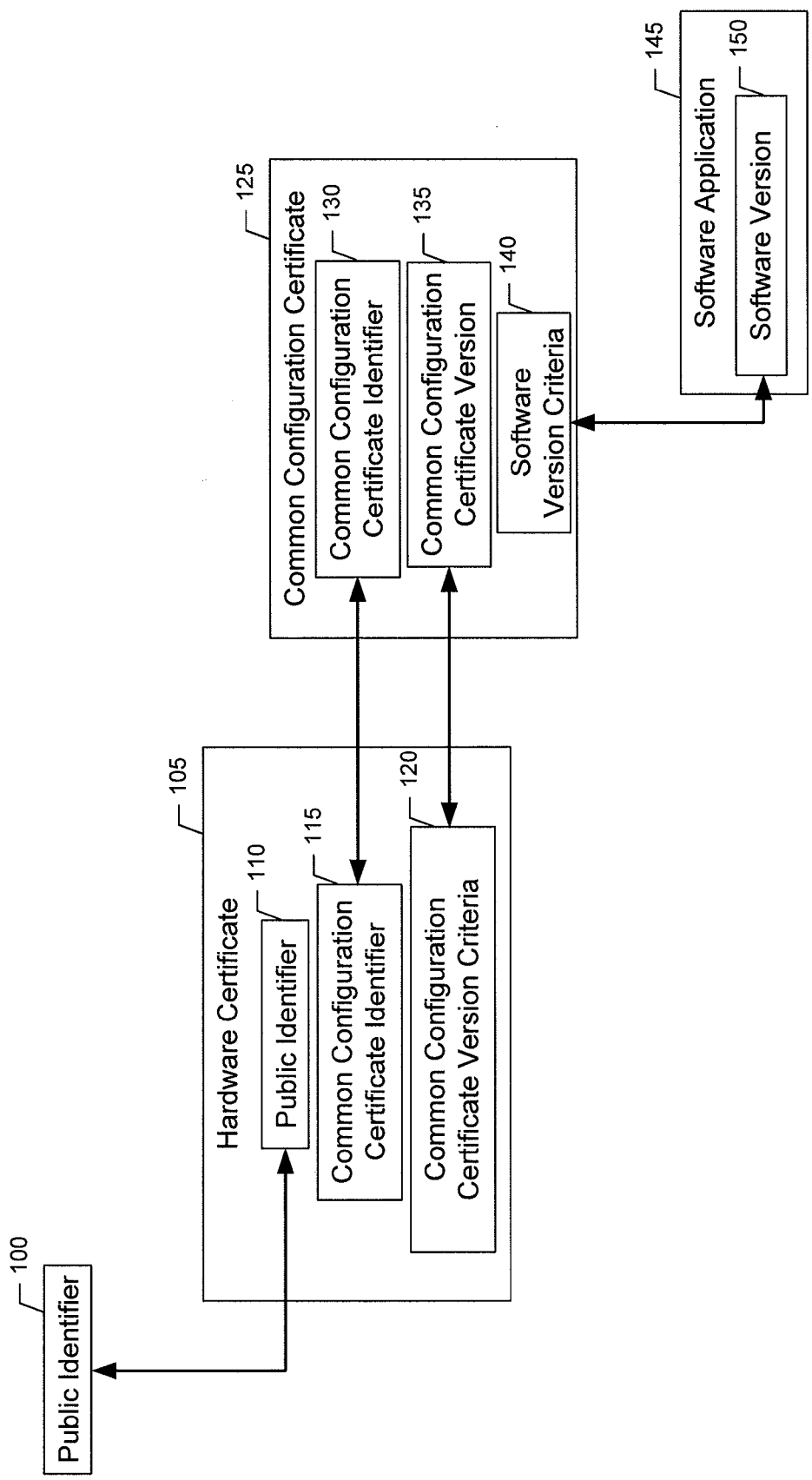
FIGS. 1a and 1b depict relationship diagrams including security certificates for managing software versions according to example embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. As used herein, the phrase software version may refer to a version of an entire software application or merely a portion or component of a software application. The term "certificate" as used herein may refer to any block of signed data which may be signed using any known scheme, such as, for example a private/public key scheme. Moreover, the term "exemplary," as used herein, is not provided to convey any qualitative assessment, but instead to merely convey an illustration of an example.

FIG. 1a depicts a relationship diagram including security certificates according to various example embodiments of the present invention. In this regard, a hardware certificate 105 and a common configuration certificate 125 (generally referred to as security certificates) may be included in a scheme for managing software versions. In some example embodiments, the implementation of the hardware certificate 105 and the common configuration certificate 125 allow for updating or upgrading a software version. Further, in some example embodiments, the implementation of the hardware certificate 105 and the common configuration certificate 125 also prevents changing to an older or undesirable software version.

Example embodiments that employ the hardware certificate 105 and the common configuration certificate 125 provide for a secure tie between a unique public identifier of a device and a particular software version to ensure that a proper software version is being utilized by the device. In this regard, the hardware certificate 105 may be more closely associated with the device and the common configuration certificate 125 may be more closely associated with a software version. A relationship between the hardware certificate 105 and the common configuration certificate 125, which may be securely authenticated, may facilitate updating of software on a device while also providing security features.

In general, according to some example embodiments, the common configuration certificate 125 may be updated on a device when an updated software version is introduced to the device. Criteria of the hardware certificate 105 may be used to verify that the common configuration certificate 125 is proper and thereby verify that the software version is proper for the device. Upon determining that a proper software version is installed on the device, the software may be permitted to be executed by the device. In this regard, a software version may be proper for a device not only because the software is an updated version, but also because the software version is proper for the particular configuration of the device (e.g., device variant).

In this regard, the particular configuration of the device may be identified via the unique public identifier of the device. For example, the public identifier may be queried in a database that stores configuration information of devices. However, implementation of the hardware certificate 105 and the common configuration certificate 125 may facilitate updating software in a manner that need not require that the public identifier of the device be verified for each new software installation. Rather, an example authentication process between the hardware certificate 105 and the common configuration certificate 125, using more generic criteria than the unique public identifier of a device, may provide for updating software versions without the complexity of involving the unique public identifier in each installation of a new software version on a device. In this manner, manufacturing of devices may be simplified where a new software version is being installed, because each installation need not be verified via the unique public identifier.

Referring again to FIG. 1a, the public identifier 100 may be a hard coded or non-modifiable value that resides on a hardware device that is capable of executing a software application. The public identifier 100 may be stored on an integrated circuit such as a read-only memory device. In some example embodiments, the public identifier 100 may be signed and/or associated with a private key. Further, the public identifier 100 may be unique to the particular associated device. As such, the public identifier 100 may be used to identify the particular configuration of the device or device variant. For example, in embodiments where the device is a cellular phone, the configuration of the device may include not only the hardware configuration of the cellular phone, but also the network provider that may be associated with the cellular phone. In this regard, the network provider may provide unique services that would require specialized software to support.

The software application 145 may be any software application for execution by the device associated with the public identifier 100. In some example embodiments, the software application 145 may be an operating system for the device. The software application 145 may have and/or include a software version 150, which may be a number, a date, a size (e.g., size in kilobytes or the like), a combination thereof, or the like. The software version 150 may be signed and/or associated with a private key to facilitate secure authentication of software application 145.

The hardware certificate 105 may be unique to a hardware device (e.g., a computer, mobile terminal, or the like) and may be stored in the memory of the device. The hardware certificate 105 may be associated with or include a public identifier 110, a common configuration certificate identifier 115, and common configuration certificate version criteria 120.

The public identifier 110 of the hardware certificate 105 may match the public identifier 100 of a device. The relationship between the public identifier 110 of the hardware certificate 105 and the public identifier 100 of a device may be used to authenticate the hardware certificate 105. In some example embodiments, the public identifier 110 may be signed and/or associated with a private key to facilitate secure authentication of the hardware certificate 105. Failure to authenticate the hardware certificate via the public identifier 110 may prevent the execution of software on the device.

The common configuration certificate identifier 115 may be a value that can be used in authenticating a common configuration certificate 125. Failure to authenticate a common configuration certificate 125 via the common configuration certificate identifier 115 may prevent the execution of software associated with that common configuration certificate. The common configuration certificate identifier 115 may be signed and/or associated with a private key to facilitate secure authentication of the common configuration certificate 125.

The common configuration certificate version criteria 120 may be criteria used to determine whether a common configuration certificate 125 is of a proper version. In this regard, the common configuration certificate version criteria 120 may be configured such that the criteria can determine whether a common configuration certificate 125 is associated with software that is of a proper version and is configured for a proper device variant. Through the use of the common configuration certificate version criteria 120, inappropriate common configuration certificates may be detected and execution of the software associated with an inappropriate common configuration certificate may be prevented. In some example embodiments, the common configuration certificate version criteria 120 may include a threshold version value for a common configuration certificate 125. In this regard, common configuration certificates with a version value higher than or equal to the threshold version value may meet at least one aspect of the common configuration certificate version criteria 120. The common configuration version criteria 120 may be signed and/or associated with a private key to facilitate secure authentication prior to application of the criteria.

The common configuration certificate 125 may be associated with a software application 145. In some example embodiments, a common configuration certificate may be common amongst all installations of a particular software application. The common configuration certificate 125 may be stored in the memory of a device. The common configuration certificate 125 may include a common configuration certificate identifier 130, a common configuration certificate version 135, and software version criteria 140.

The common configuration certificate identifier 130 may be a value that can be used in authenticating a common configuration certificate 125 with a hardware certificate 105. In this regard, in some example embodiments, if the common configuration certificate identifier 115 of a hardware certificate matches the common configuration certificate identifier 130 of the common configuration certificate 125, then the common configuration certificate 125 may be authenticated. Failure to authenticate a common configuration certificate via the common configuration certificate identifier 130 may prevent the execution of software associated with the common configuration certificate. Similar to the common configuration certificate identifier 115, the common configuration certificate identifier 130 may be signed and/or associated with a private key to facilitate secure authentication of the common configuration certificate 125.

As described above, the common configuration certificate version 135 may be applied to the common configuration certificate version criteria 120 of a hardware certificate 105 to determine whether the common configuration certificate version 135 satisfies the common configuration certificate version criteria 120. Failure of the common configuration certificate version to satisfy the common configuration certificate version criteria 120 may result in preventing execution of software associated with a common configuration certificate. Similar to the common configuration certificate identifier criteria 120, the common configuration certificate version 135 may be signed and/or associated with a private key to facilitate secure authentication of the common configuration certificate version 135.

The software version criteria 140 may be criteria used to determine whether a software version 150 is of a proper version for a common configuration certificate 125. The software version criteria 140 may contribute an added level of security for ensuring that the common configuration certificate 125 is not used in conjunction with an inappropriate software version. As such, through the use of the software version criteria 140, inappropriate software applications may be detected and execution of the software applications may be prevented. In some example embodiments, the software version criteria 140 may include a threshold version value for a software version 150. In this regard, software applications with a version value higher than or equal to the threshold version value may satisfy the software version criteria 140. The software version criteria 140 may be signed and/or associated with a private key to facilitate secure authentication prior to application of the criteria to a software version 150.

Figure 1B:
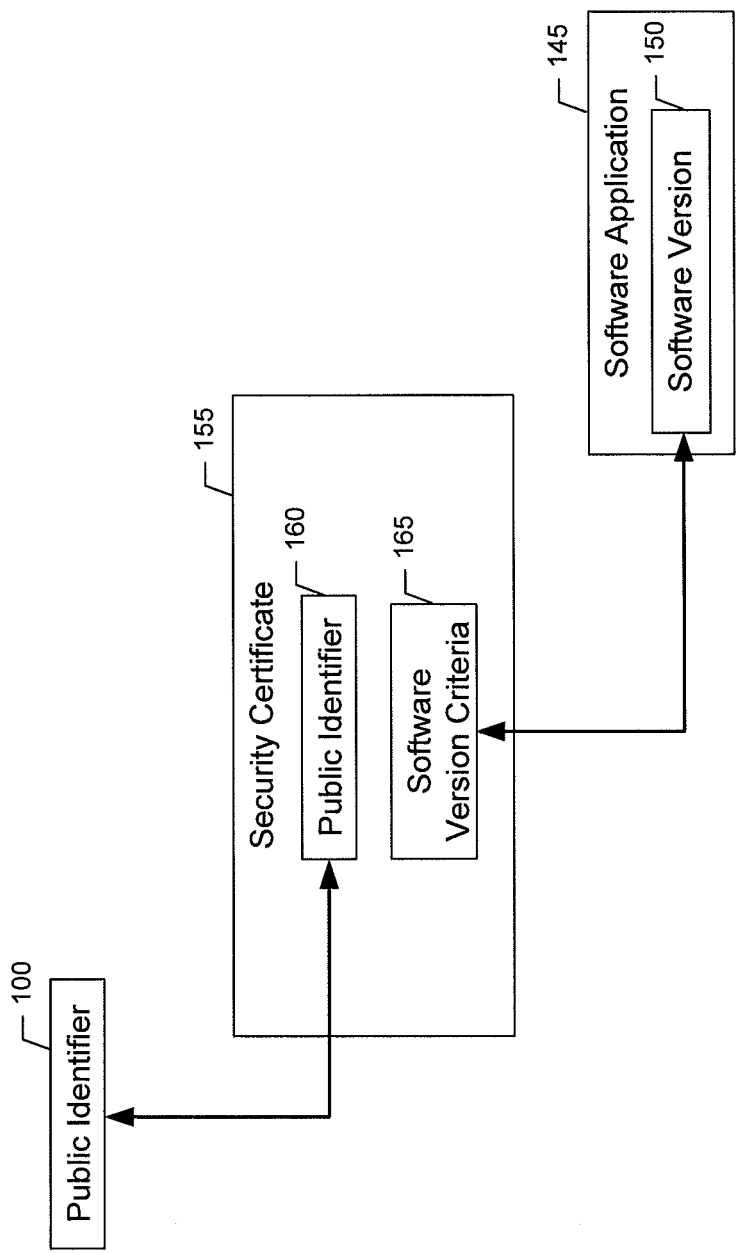

FIG. 1b depicts a relationship diagram for an alternative embodiment for managing software versions. In this regard, the example scheme associated with FIG. 1b utilizes a single security certificate 155. The security certificate 155 may be unique to a hardware device (e.g., a computer, mobile terminal, or the like) and may be stored in the memory of the device. The security certificate 155 may be associated with or include a public identifier 160, and software version criteria 165.

The public identifier 160 of the security certificate 155 may match the public identifier 100 of a device as described above. The relationship between the public identifier 160 of the security certificate 155 and the public identifier 100 of a device may be used to authenticate the security certificate 155. In some example embodiments, the public identifier 160 may be signed and/or associated with a private key to facilitate secure authentication of the security certificate 155. Failure to authenticate the security certificate 155 via the public identifier 160 may prevent the execution of software on the device.

The software version criteria 165 may be criteria used to determine whether a software version 150 is of a proper version for execution on a device. Through the use of the software version criteria 165, inappropriate software applications may be detected and execution of the software applications may be prevented. In some example embodiments, the software version criteria 165 may include a threshold version value for a software version 150. In this regard, software applications with a version value higher than or equal to the threshold version value may satisfy the software version criteria 165. The software version criteria 165 may be signed and/or associated with a private key to facilitate secure authentication prior to application of the criteria to a software version 150.

Figure 2:
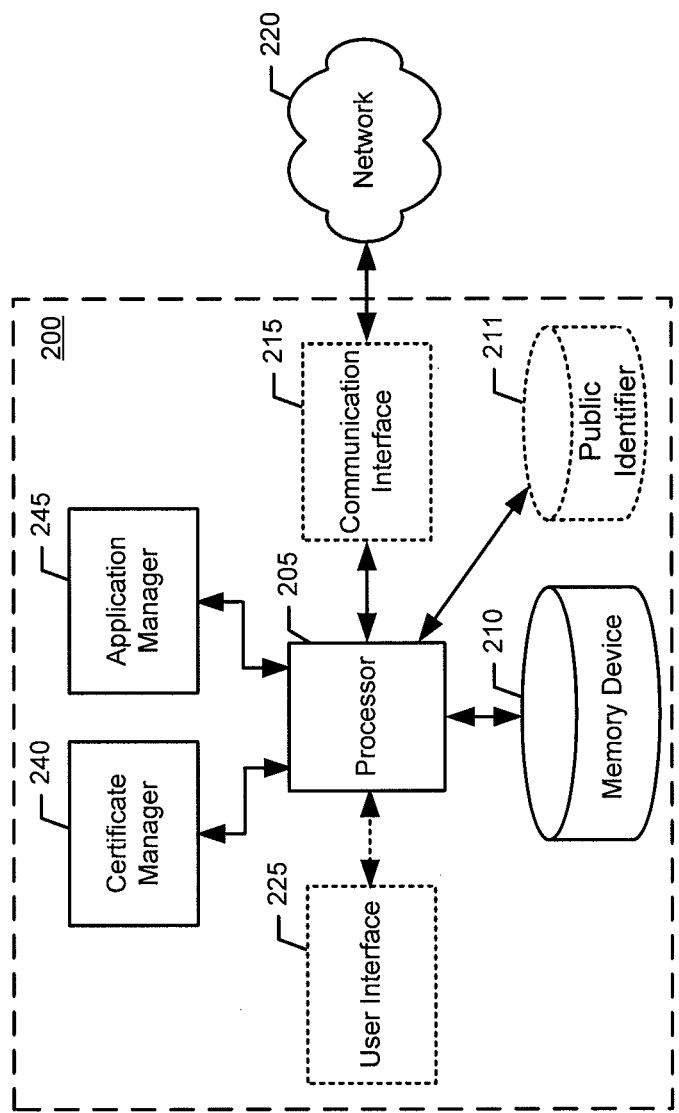
FIG. 2 is a schematic block diagram of an apparatus for managing software versions according to various example embodiments of the present invention.

FIG. 2 illustrates an example apparatus 200 that may provide for managing software versions as described herein. In some example embodiments, the apparatus 200 may be embodied as, or included as a component of, a computing device and/or a communications device with wired or wireless communications capabilities. Some examples of the apparatus 200 may include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 200 may be configured to implement various aspects of the present invention as described herein including, for example, various example methods of the present invention, where the methods may be implemented by means of a hardware or software configured processor, computer-readable medium, or the like.

The apparatus 200 may include or otherwise be in communication with a processor 205, and a memory device 210, which may, but need not include read-only memory storage for a public identifier 211. In this regard, in some example embodiments, the memory storage for public identifier 211 is separate from the memory device 210. Further, in some embodiments, such as embodiments where the apparatus 200 is a mobile terminal, the apparatus 200 may also include a communications interface 215, and/or a user interface 225. The processor 205 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an example embodiment, the processor 205 is configured to execute instructions stored in the memory device 210 or instructions otherwise accessible to the processor 205. Processor 205 may also be configured to facilitate communications via the communications interface by, for example, controlling hardware and/or software included in the communications interface.

The memory device 210 may be configured to store various information involved in implementing embodiments of the present invention such as security certificates (e.g., hardware certificates and common configuration certificates). The memory device 210 may be a computer-readable storage medium that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the apparatus 200 to carry out various functions in accordance with example embodiments of the present invention. For example, the memory device 210 could be configured to buffer input data for processing by the processor 205. Additionally, or alternatively, the memory device 210 may be configured to store instructions for execution by the processor 205.

The user interface 225 may be in communication with the processor 205 to receive user input at the user interface 225 and/or to provide output to a user as, for example, audible, visual, mechanical or other output indications. The user interface 225 may include, for example, a keyboard, a mouse, a joystick, a display (e.g., a touch screen display), a microphone, a speaker, or other input/output mechanisms.

The communication interface 215 may be any device or means embodied in either hardware, software, or a combination of hardware and software that is configured to receive and/or transmit data from/to a network and/or any other device or module in communication with the apparatus 200. In this regard, the communication interface 215 may include, for example, an antenna, a transmitter, a receiver, a transceiver and/or supporting hardware, including a processor or software for enabling communications with network 220. Via the communication interface 215 and the network 220, the apparatus 200 may communicate with various other network entities.

The communications interface 215 may be configured to provide for communications in accordance with any wired or wireless communication standard. For example, communications interface 215 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The certificate manager 240 and the application manager 245 of apparatus 200 may be any means or device embodied in hardware, software, or a combination of hardware and software, such as processor 205 implementing software instructions or a hardware configured processor 205, that is configured to carry out the functions of certificate manager 240 and/or application manager 245 as described herein. In an example embodiment, the processor 205 may include, or otherwise control certificate manager 240 and/or application manager 245. In various example embodiments, the certificate manager 240 and/or application manager 245 may reside on differing apparatuses such that some or all of the functionality of certificate manager 240 and/or application manager 245 may be performed by a first apparatus, and the remainder of the functionality of the certificate manager 240 and/or application manager 245 may be performed by one or more other apparatuses.

In some example embodiments, the certificate manager 240 may be configured to receive the software application with the first security certificate. In this regard, the first security certificate may be associated with a software application.

The certificate manager 240 may also be configured to determine whether a security identifier of a first security certificate matches a trusted security identifier. In some example embodiments, the security identifier is a common configuration certificate identifier of a common configuration certificate (e.g., common configuration certificate identifier 135) and the trusted security identifier is a common configuration certificate identifier of a hardware certificate (e.g., common configuration certificate identifier 115). In some example embodiments, the security identifier is a public identifier of a security certificate (e.g., public identifier 160) and the trusted security identifier is a public identifier of a device (e.g., public identifier 100). Further, in some example embodiments, determining whether a security identifier of a first security certificate matches a trusted security identifier involves utilizing signed security identifier and/or private keys to authenticate the security identifier of the first security certificate.

The certificate manager 240 may also be configured to determine whether a software version of a software application satisfies software version criteria of the first security certificate. In this regard, the first security certificate may include software version criteria. In some example embodiments, the certificate manager 240 is configured to determine whether a software version of a software application satisfies software version criteria of the first security certificate, in response to determining that the security identifier of the first certificate matches the trusted security identifier. In some example embodiments, the software version criteria may be satisfied by software applications having a threshold software version or a software version higher than the threshold software version. According to various embodiments, a higher version may include any progressive or sequential increase in ordering, where the next higher version may have been released more recently. In some example embodiments, the indications of higher versions may be indicated by any collection of alpha-numeric characters.

In some example embodiments, the certificate manager 240 is also configured to authenticate the trusted security identifier by verifying that a device identifier of a second security certificate matches a trusted device identifier. In this regard, in some example embodiments, the trusted security identifier (e.g., the common configuration certificate identifier 115 of hardware certificate 105) may be authenticated by verifying that a device identifier of a second security certificate (e.g., the public identifier 110 of hardware certificate 105) matches a trusted device identifier (e.g., public identifier 100). In some example embodiments, the trusted device identifier is a unique, non-modifiable value associated with the apparatus 200.

Further, in some example embodiments, the certificate manager 240 is also configured to determine whether a security certificate version of the first security certificate satisfies the security certificate version criteria of the second security certificate. In some example embodiments, the certificate manager 240 may also be configured to determine whether a security certificate version of the first security certificate (e.g., common configuration certificate version 135) satisfies the security certificate version criteria of the second security certificate (e.g., common configuration certificate version criteria 120). In this regard, the second security certificate may include security certificate version criteria. The security certificate version criteria may be satisfied by a value associated with acceptable, predefined device variants. Further, the certificate manager 240 may also be configured to determine whether a security certificate version of the first security certificate satisfies the security certificate version criteria of the second security certificate and determine whether the security identifier of a first security certificate matches the trusted security identifier, in response to the trusted security identifier being authenticated.

The application manager 245 may be configured to permit execution of a software application, in response to determining that a software version associated with the software application satisfies software version criteria of the first security certificate. In some example embodiments, the application manager 245 is configured to permit execution of a software application in response to a hardware certificate (e.g., hardware certificate 105) and common configuration certificate (e.g., common configuration certificate 125) being authenticated as described herein. Further, in some example embodiments, the application manager 245 is configured to permit execution of a software application in response to a single security certificate being authenticated (e.g., security certificate 155).

Figure 3:
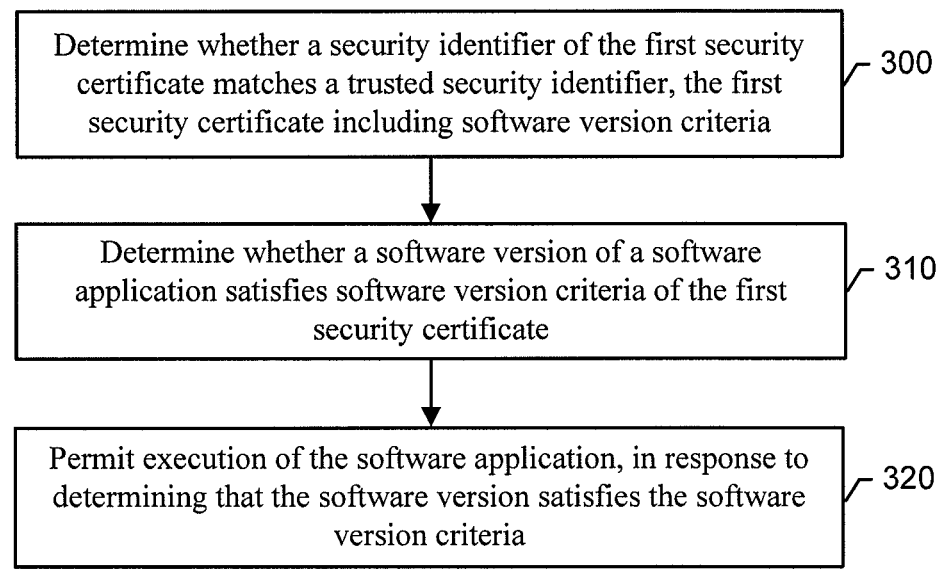
FIGS. 3 and 4 are flowcharts of methods for managing software versions according to various example embodiments of the present invention.
Figure 4:
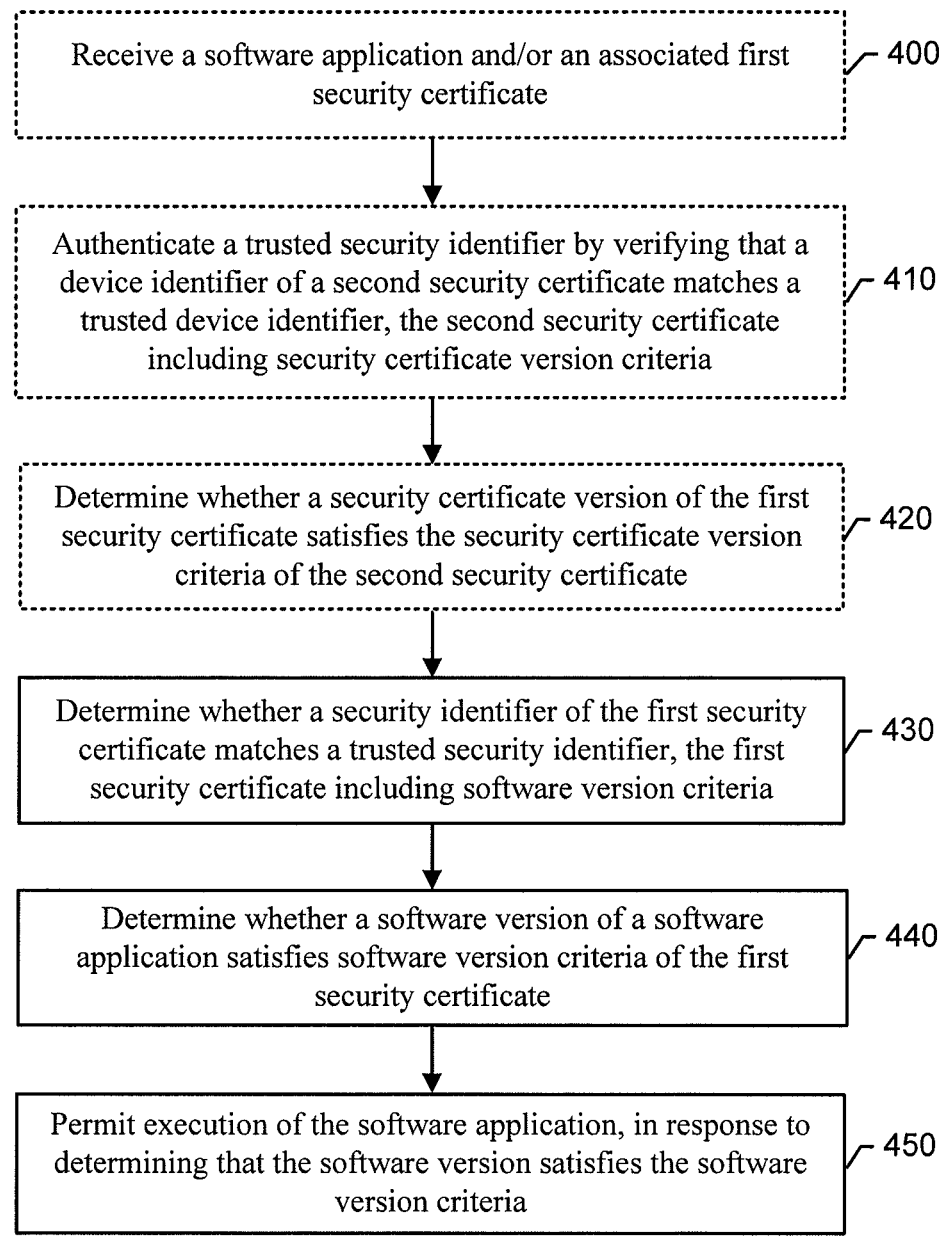

FIGS. 3 and 4 illustrate flowcharts of a system, method, and computer program product according to example embodiments of the invention. It will be understood that each block, step, or operation of the flowcharts, and/or combinations of blocks, steps, or operations in the flowcharts, can be implemented by various means. Means for implementing the blocks, steps, or operations of the flowcharts, and/or combinations of the blocks, steps or operations in the flowcharts may include hardware, firmware, and/or software including one or more computer program code instructions, program instructions, or executable computer-readable program code instructions. In one example embodiment, one or more of the procedures described herein may be embodied by program code instructions. In this regard, the program code instructions which embody the procedures described herein may be stored by or on a memory device, such as memory device 210, of an apparatus, such as apparatus 200, and executed by a processor, such as the processor 205. As will be appreciated, any such program code instructions may be loaded onto a computer or other programmable apparatus (e.g., processor 205, memory device 210) to produce a machine, such that the instructions which execute on the computer or other programmable apparatus create means for implementing the functions specified in the flowcharts' block(s), step(s), or operation(s). These program code instructions may also be stored in a computer-readable storage medium that can direct a computer, a processor, or other programmable apparatus to function in a particular manner, such that the instructions stored in the computer-readable storage medium produce an article of manufacture including instruction means which implement the function specified in the flowcharts' block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowcharts' block(s), step(s), or operation(s).

Accordingly, blocks, steps, or operations of the flowcharts support combinations of means for performing the specified functions, combinations of steps for performing the specified functions, and program code instruction means for performing the specified functions. It will also be understood that one or more blocks, steps, or operations of the flowcharts, and combinations of blocks, steps, or operations in the flowchart, can be implemented by special purpose hardware-based computer systems which perform the specified functions or steps, or combinations of special purpose hardware and program code instructions.

FIG. 3 depicts a flowchart describing an example method for managing software versions. At 300, the example method includes determining whether a security identifier of a first security certificate (e.g., a public identifier of a hardware certificate) matches a trusted security identifier (e.g., a public identifier of a device). At 310, the example method further includes determining whether a software version of a software application satisfies software version criteria of the first security certificate. In some example embodiments, the software version criteria may be satisfied by a software application with a version that is equal to a threshold version value or exceeds a threshold value. In some example embodiments, version date thresholds, and/or software size thresholds (e.g., size in kilobytes) may also be used as criteria. Further, in some example embodiments, the determining performed at 310 may occur in response to determining that the security identifier of the first certificate matches the trusted security identifier at 300. The example method may also include permitting execution of the software application by a processor at 320. Execution of the software application may be permitted in response to determining that the software version satisfies the software version criteria at 310. Further, execution of the software application may be permitted in response to determining that one or more security certificates have been authenticated.

FIG. 4 depicts a flowchart of another method for managing software versions in accordance with example embodiments of the present invention. At 400, the example method may include receiving a software application and/or optionally receive an associated first security certificate (e.g., a common configuration certificate). The first security certificate may be received with the software application or separate from the software application, possibly at different time. In some example embodiments, the software application and the associated first security certificate may be received on a memory device, such as the memory device 210.

The example method may also include, at 410, authenticating a trusted security identifier (e.g., a common configuration certificate identifier of a hardware certificate) by verifying that a device identifier of a second security certificate (e.g., public identifier of a hardware certificate) matches a trusted device identifier (e.g., a public identifier of a device). In this regard, the second security certificate may also include security certificate version criteria (e.g., common configuration certificate version criteria). Further, the trusted device identifier may be a unique, non-modifiable value.

At 420, the example method may include determining whether a security certificate version of the first security certificate (e.g., the common configuration certificate version) satisfies the security certificate version criteria of the second security certificate. The determining performed at 420 may occur in response to the trusted security identifier being authenticated at 410. Further, the example method may also include, at 430, determining whether the security identifier of the first security certificate (e.g., the common configuration certificate identifier of a common configuration certificate) matches the trusted security identifier (e.g., the common configuration certificate identifier of the hardware certificate). In some example embodiments, the security certificate version criteria may be satisfied by a value associated with acceptable, predefined device variants. Further, in some example embodiments, the determining performed at 430 may occur in response to the trusted security identifier being authenticated at 410.

At 440, the example method further may include determining whether a software version of a software application satisfies software version criteria of the first security certificate. In some example embodiments, the software version criteria may be satisfied by a software application with a version that is equal to a threshold version value or exceeds a threshold value. In some example embodiments, version date thresholds, and/or software size thresholds (e.g., size in kilobytes) may also be used as criteria. In some example embodiments, the determining performed at 440 may occur in response to determining that the security identifier of the first certificate matches the trusted security identifier at 430.

The example method may also include permitting execution of the software application by a processor at 450. Execution of the software application may be permitted in response to determining that the software version satisfies the software version criteria at 440.

An effect of some example embodiments of the invention is to prevent unauthorized software versions to be executed by devices. This has the advantage of preventing out-of-date or otherwise undesirable software from being installed and utilized on devices, such as computing and/or communications devices. Further, some example embodiments of the present invention allow new and/or improved software to be installed on devices during manufacturing or prior to transfer to a consumer and thereby prevent reversion of the software on these devices to previous or undesirable versions of software after the devices are in the possession of the consumer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   authenticating a second security certificate by verifying that a device identifier of the second security certificate matches a trusted device identifier, the second security certificate including security certificate version criteria;
   in response to the second security certificate being authenticated, determining whether a security certificate version of a first security certificate satisfies the security certificate version criteria of the second security certificate and determining whether a security identifier of the first security certificate matches a trusted security identifier, the first security certificate including software version criteria;
   determining whether a software version of a software application satisfies software version criteria of the first security certificate, in response to determining that the security identifier of the first certificate matches the trusted security identifier; and
   permitting execution of the software application by a processor, in response to determining that the software version satisfies the software version criteria and in response to determining that the security certificate version of the first security certificate satisfies the security certificate version criteria of the second security certificate.

2. The method of claim 1, wherein authenticating the second security certificate by verifying that the device identifier of the second security certificate matches the trusted device identifier includes the trusted device identifier being a unique, non-modifiable value.

3. The method of claim 1, wherein determining whether the security certificate version of the first security certificate satisfies the security certificate version criteria of the second security certificate includes the security certificate version criteria being satisfied by a value associated with predefined device variants.

4. The method of claim 1 further comprising receiving the software application with the first security certificate, the first security certificate being associated with the software application.

5. The method of claim 1, wherein determining whether the software version of the software application satisfies the software version criteria of the first security certificate includes the software version criteria being satisfied by software applications having a threshold software version or a software version higher than the threshold software version.

6. An apparatus comprising at least one processor and at least one memory including computer program code, the at least one memory and the computer program code configured to, with the at least one processor, cause the apparatus at least to:
authenticate a second security certificate by verifying that a device identifier of the second security certificate matches a trusted device identifier, the second security certificate including security certificate version criteria;
in response to the second security certificate being authenticated, determine whether a security certificate version of a first security certificate satisfies the security certificate version criteria of the second security certificate and determine whether a security identifier of the first security certificate matches a trusted security identifier, the first security certificate including software version criteria;
determine whether a software version of a software application satisfies software version criteria of the first security certificate, in response to determining that the security identifier of the first certificate matches the trusted security identifier; and
permit execution of the software application, in response to determining that the software version satisfies the software version criteria and in response to determining that the security certificate version of the first security certificate satisfies the security certificate version criteria of the second security certificate.

7. The apparatus of claim 6, wherein the apparatus caused to authenticate the second security certificate by verifying that the device identifier of the second security certificate matches the trusted device identifier includes being caused to authenticate the second security certificate by verifying that the device identifier of the second security certificate matches the trusted device identifier, the trusted device identifier being a unique, non-modifiable value.

8. The apparatus of claim 6, wherein the apparatus caused to determine whether the security certificate version of the first security certificate satisfies the security certificate version criteria of the second security certificate includes being caused to determine whether the security certificate version of the first security certificate satisfies the security certificate version criteria of the second security certificate, the security certificate version criteria being satisfied by a value associated with a predefined device variant.

9. The apparatus of claim 6, wherein the apparatus is further caused to receive the software application with the first security certificate, the first security certificate being associated with the software application.

10. The apparatus of claim 6 further comprising a memory device, the memory device configured to store the second security certificate.

11. The apparatus of claim 6, wherein the apparatus caused to determine whether the software version of the software application satisfies the software version criteria of the first security certificate includes being caused to determine whether the software version of the software application satisfies the software version criteria of the first security certificate, the software version criteria being satisfied by software applications having a threshold software version or a software version higher than the threshold software version.

12. A computer program product comprising at least one non-transitory computer-readable storage medium having executable computer-readable program code instructions stored therein, the computer-readable program code instructions configured to:
authenticate a second security certificate by verifying that a device identifier of the second security certificate matches a trusted device identifier, the second security certificate including security certificate version criteria;
in response to the second security certificate being authenticated, determine whether a security certificate version of a first security certificate satisfies the security certificate version criteria of the second security certificate and determine whether a security identifier of the first security certificate matches a trusted security identifier, the first security certificate including software version criteria;
determine whether a software version of a software application satisfies software version criteria of the first security certificate, in response to determining that the security identifier of the first certificate matches the trusted security identifier; and
permit execution of the software application, in response to determining that the software version satisfies the software version criteria and in response to determining that the security certificate version of the first security certificate satisfies the security certificate version criteria of the second security certificate.

13. The computer program product of claim 12, wherein the computer-readable program code instructions configured to authenticate the second security certificate by verifying that the device identifier of the second security certificate matches the trusted device identifier include being configured to authenticate the second security certificate by verifying that the device identifier of the second security certificate matches the trusted device identifier, the trusted device identifier being a unique, non-modifiable value.

14. The computer program product of claim 12, wherein the computer-readable program code instructions configured to determine whether the security certificate version of the first security certificate satisfies the security certificate version criteria of the second security certificate include being configured to determine whether the security certificate version of the first security certificate satisfies the security certificate version criteria of the second security certificate, the security certificate version criteria being satisfied by a value associated with a predefined device variant.

15. The computer program product of claim 12, wherein the computer-readable program code instructions are further configured to receive the software application with the first security certificate, the first security certificate being associated with the software application.

16. The computer program product of claim 12, wherein the computer-readable program code instructions configured to determine whether the software version of the software application satisfies the software version criteria of the first security certificate include being configured to determine whether the software version of the software application satisfies the software version criteria of the first security certificate, the software version criteria being satisfied by software applications having a threshold software version or a software version higher than the threshold software version.

17. An apparatus comprising:
   means for authenticating a second security certificate by verifying that a device identifier of a second security certificate matches a trusted device identifier, the second security certificate including security certificate version criteria;
   means, in response to the second security certificate being authenticated, for determining whether a security certificate version of a first security certificate satisfies the security certificate version criteria of the second security certificate and determining whether a security identifier of the first security certificate matches a trusted security identifier, the first security certificate including software version criteria;
   means for determining whether a software version of a software application satisfies software version criteria of the first security certificate, in response to determining that the security identifier of the first certificate matches the trusted security identifier; and
   means for permitting execution of the software application, in response to determining that the software version satisfies the software version criteria and in response to determining that the security certificate version of the first security certificate satisfies the security certificate version criteria of the second security certificate.

\* \* \* \* \*